United States Patent Office 3,291,380
Patented Dec. 13, 1966

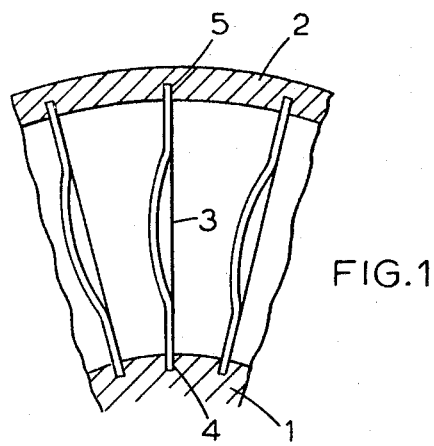
FIG.1
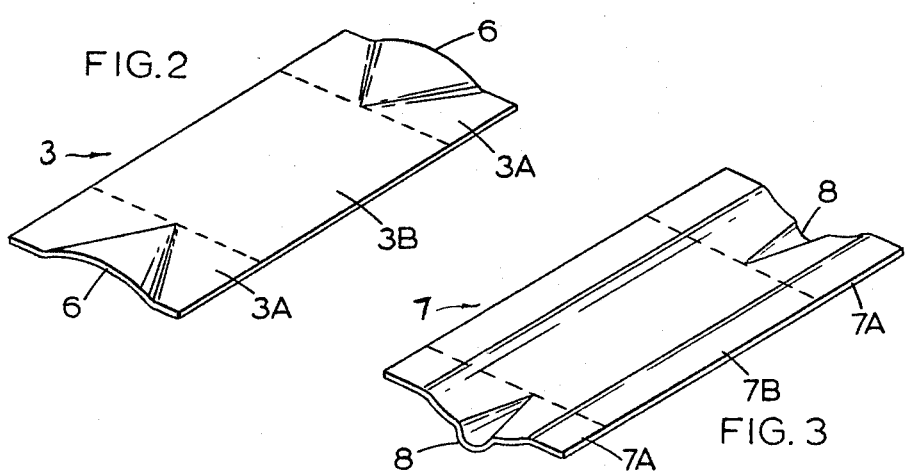
FIG.2
FIG.3
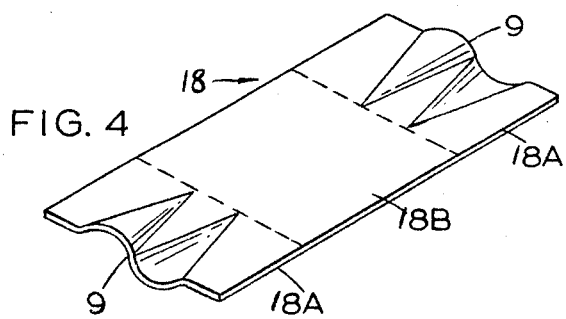
FIG.4

3,291,380
PRESSURE EXCHANGER CELL RINGS
James Brown, Fleet, and James Alan Costick, Whitstable, England, assignors to Power Jets (Research & Development) Limited, London, England, a British company
Filed Oct. 20, 1965, Ser. No. 498,749
Claims priority, application Great Britain, Mar. 12, 1965, 10,647/65
3 Claims. (Cl. 230—69)

The present invention relates to pressure exchanger cell rings.

The term "pressure exchanger" is used herein to mean apparatus including cells in which one gas quantity expands so compressing another gas quantity with which it is in direct contact, ducting to lead gas at different pressures steadily to and from the cells and means to effect relative motion between the cells and the ducting.

The cells are usually open-ended and defined by a plurality of walls extending generally radially between an inner hub member and an outer shroud member. Together the cell walls, hub and shroud constitute a pressure exchanger cell ring. Customarily, the axially extending edges of the cell walls are secured to the hub and the shroud and the radially extending free ends of the cell walls are unsupported except where they are secured to the hub and shroud.

As the gas quantities within any one cell interact, compression waves are set up which travel through the cell and coalesce into a travelling shock wave at some point along the length of the cell. The travelling shock wave applies a sudden travelling load on one of the cell walls at and about the point of coalescence. This sudden loading causes a free vibration at the natural frequency of the cell wall and, since the loading is applied to only a portion of the cell wall, the free vibration is transmitted within the wall material along the length of the cell wall. Upon reaching the free ends of the cell wall, the free vibration is reflected back along the length of the cell wall thus inducing the free ends to vibrate relatively freely in a two-dimensional mode with a larger amplitude than that of the mid-portion of the cell wall away from the free ends. Consequently, the free ends of the cell wall and the portions of the cell wall adjacent these ends are subjected to higher stress than the mid-portion of the cell wall intermediate these end-portions.

According to the present invention, a pressure exchanger cell ring includes an inner member, an outer member and a plurality of cell walls extending between the inner and outer members, the axially extending edges of the cell walls being secured to the inner and outer members and the free ends of the cell walls being unsupported except where they are secured to the inner and outer members, the free ends of each cell wall being shaped in such manner that the rigidity of each free end is increased with respect to the rigidity of the cell wall at a position intermediate the free-ends.

The rigidity of the free ends may be increased by curving or crimping the free-ends of the cell walls.

The invention will now be described, by way of example, with reference to the accompanying diagrammatic drawing in which:

FIGURE 1 is an end-view of a segment of a pressure exchanger cell ring in accordance with the present invention;

FIGURE 2 is a perspective-view of one of the cell walls of the cell ring shown in FIGURE 1; and FIGURES 3 and 4 are perspective-views of cell walls of further cell rings in accordance with the present invention.

The pressure exchanger cell ring illustrated in FIGURE 1 includes an inner hub member 1, an outer shroud member 2 and a plurality of generally radially disposed cell walls 3. The axially extending edges of the cell walls 3 are brazed into slots 4, 5 extending along the length of the hub 1 and shroud 2 respectively. The radially extending free-ends of the cell walls 3 are unsupported except where they are brazed into the slots 4, 5.

In FIGURE 2, one of the cell walls 3 is shown in perspective. For the purposes of description this cell wall has been divided into three portions, two end-portions referenced 3A and a mid-portion 3B. Each end-portion 3A has a corrugation 6 which has its greatest depth at the free-ends of the cell wall. The radius of curvature of each corrugation smoothly increases between the free-end and the generally flat mid-portion 3B of the cell wall. As shown, each corrugation extends to a distance along the axial length of the cell wall approximating to one half of the cell wall height. However, the distance may vary between one quarter of and twice the cell wall height.

In operation, the cell ring rotates between end-plates, positioned one adjacent each end of the cell ring. Arcuate ports are formed in each end-plate and place the open-ends of the cells in communication with ducts which convey gases at high and lower-pressures to and from the cells. One end-plate includes a port to lead high-pressure gas to the cells and a port to lead lower-pressure gas to the cells, and the other end-plate includes a port to lead high-pressure gas from the cells and a port to lead lower-pressure gas from the cells. The high-pressure inlet port of one end-plate, the high-pressure outlet port of the other end-plate and cells at any one time in communication with these ports constitute a high-pressure compression stage of the pressure exchanger. As the cell reaches the compression stage, the incoming high-pressure gas compresses the gas already present in the cell and compression waves are set up which travel through the cell and coalesce into a shock wave at some point along the length of the cell. The shock wave applies a sudden travelling load on each cell wall which creates a free vibration of the natural frequency of each cell wall. Since the loading is applied to only a relatively small portion of any one cell wall, the free vibration is transmitted within the wall material along the length of the cell wall. Upon reaching the unsupported free-ends of the wall, the free vibration is reflected back along the length of the wall.

Reflection of the transmitted vibration induces the unsupported free-ends to vibrate relatively freely which causes the end-portions of the cell wall to vibrate freely in a two-dimensional mode and with a larger amplitude than that of the mid-portion of the cell wall. Consequently, the free-ends and the end-portions of the cell wall will be subjected to higher stress than the mid-portion of the cell wall.

With the cell walls 3 shown in FIGURES 1 and 2, vibration of the end-portions 3A relative to the mid-portion 3B is reduced by the corrugations 6 which increase the rigidity of the end-portions. Hence, the stress throughout the cell wall due to the travelling shock waves is substantially the same along the whole axial length of the cell wall.

In FIGURE 3, a cell wall 7 of curved cross-section is shown in perspective-view. As in FIGURE 2, this curved cell wall has for the purposes of description been divided into two end-portions referenced 7A and a mid-section 7B. Each end-portion 7A has a corrugation 8 which has its greatest depth at the free-ends of the cell wall. The radius of curvature of each corrugation smoothly increases between the free-end and the curved mid-portion of the cell wall. As in FIGURE 2, vibration of the end-portions 7A relative to the mid-portion 7B is reduced by the corrugations 8 which increase the rigidity of the end-portions. Hence, the stress throughout the cell wall due to the travelling shock waves is substantially the same along the axial length of the cell wall.

In FIGURE 4, the rigidity of the end-portions 18A of a generally flat cell wall 18 is increased by corrugations 9 of generally S cross-section.

It will be appreciated that while the invention has been described in relation to cell walls in which each end-portion is corrugated, any curved or crimped form may be used which increases the rigidity of the free ends of the cell wall. Furthermore, in addition to the generally flat and curved cell walls described, the invention is applicable to cell walls of any cross-section which require increased rigidity at their free-ends due to reflection of transmitted vibration which induces the unsupported free-ends to vibrate relatively freely.

Whilst the invention has been described with reference to a "uni-flow" pressure exchanger, it is to be understood that the invention can equally well be applied to a "reverse-flow" pressure exchanger, that is one in which the direction of gas flow through the cells at the high-pressure compression stage is opposite to the direction of gas flow through the low-pressure inlet and outlet ports.

We claim:

1. A pressure exchanger cell ring including an inner member, an outer member and a plurality of cell walls extending between the inner and outer members, the axially extending inner and outer edges of the cell walls being secured to the inner and outer members respectively and the free-ends of the cell walls being unsupported except where they are secured to the inner and outer members, the free-ends of each cell wall being shaped in such manner that the rigidity of each free-end is increased with respect to the rigidity of the cell wall at a position intermediate the free-ends.

2. A pressure exchanger cell ring as claimed in claim 1 in which each free-end is corrugated, which corrugations have their greatest depth at the free-ends of the cell walls the radius of curvature of each corrugation smoothly increasing between the free-end of the cell wall and a position intermediate the free-end.

3. A pressure exchanger cell ring as claimed in claim 2 in which the cell walls, at their positions intermediate the free-ends, are of curved cross-section.

References Cited by the Examiner

UNITED STATES PATENTS

| 3,019,962 | 2/1962 | Spalding | 230—69 |
| 3,101,168 | 8/1963 | Berchtold | 230—69 |
| 3,234,736 | 2/1966 | Spalding | 230—69 |

FOREIGN PATENTS 840,408   7/1960   Great Britain.

MARTIN P. SCHWADRON, *Primary Examiner.*

E. A. POWELL, JR., *Assistant Examiner.*